July 27, 1954
C. W. AHMER
2,684,536
SELF-ALIGNING PLUG GAUGE
Filed March 22, 1951
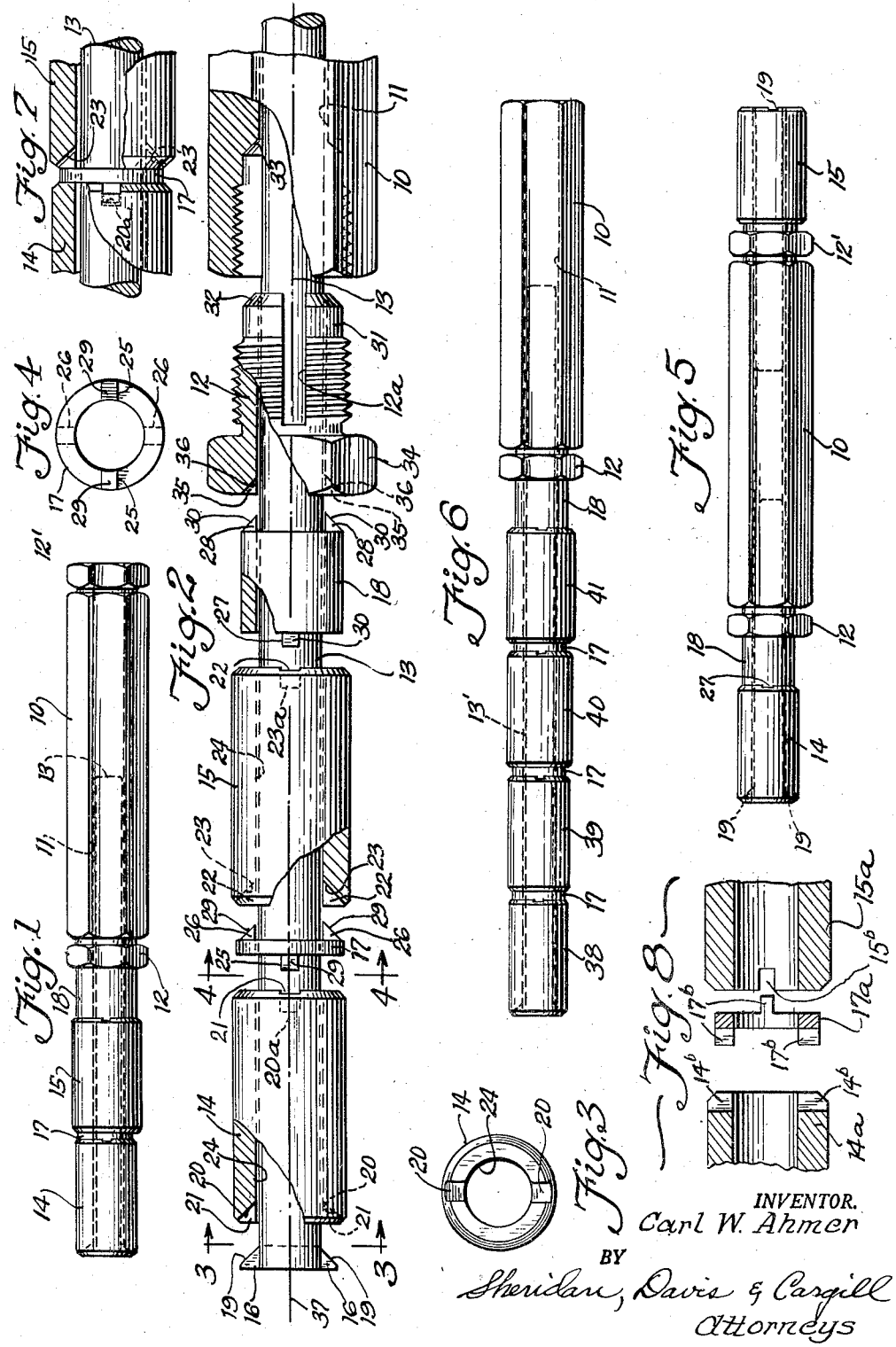
INVENTOR.
Carl W. Ahmer
BY
Sheridan, Davis & Cargill
Attorneys Patented July 27, 1954

2,684,536

UNITED STATES PATENT OFFICE 2,684,536

SELF-ALIGNING PLUG GAUGE

Carl W. Ahmer, Chicago, Ill., assignor to Ancraft Products Company, Chicago, Ill., a partnership Application March 22, 1951, Serial No. 217,039

6 Claims. (Cl. 33—178)

This invention relates to improvements in plug gages.

Plug gages have heretofore been made in various forms, some comprising "go" and "no go" cylindrical gaging elements mounted on opposed ends of central handles and others have had the elements located in contiguous relation at one end of the handles. In some instances, the "go" and "no go" elements have been integrally formed but such construction does not permit the individual gage elements to be reversed end for end nor permit one of the companion elements to be replaced when worn to a predetermined degree, or damaged, without replacing the other also. For the purpose of facilitating end-to-end reversal of the individual gage elements, some plug gages have been provided with elements having longitudinal passages or bores which enable them to be arranged upon a spindle or arbor in the proper relation. The exterior cylindrical surfaces of the gage elements are employed in checking hole sizes and hence should be accurately formed, but where two such elements are arranged contiguously on a spindle in a pair of "go" and "no go" sizes which determine the minimum tolerance permitted for the holes being checked (that is, the holes must be of a diameter to permit the insertion of the "go" element but insufficient to permit insertion of the larger diameter "no go" element) it is apparent that the internal cylindrical surfaces formed by the bores, if fitted closely on the spindle, must be truly coaxial with the respective external surfaces, since otherwise the external gaging surfaces of the elements will not be coaxial and hence, while the "go" element may be inserted in the hole being checked, the "no go" element may be excluded from the hole solely by reason of the relative eccentricity of its gaging surface with respect to the gaging surface of the other element.

It is the principal object of the present invention to provide a plug gage comprising longitudinally bored gaging elements adapted to be positioned in selected relation upon a spindle or arbor whereby the elements are adapted for individual end-to-end reversal or for individual replacement, and means for permitting adjacent elements to shift into precise coaxiality with respect to the external gaging surfaces of the elements notwithstanding that the bores of one or both or all of the elements may not be truly coaxial with respect to the external gaging surfaces of the respective elements.

A more specific object of the invention is to provide a plug gage having individually reversible tubular gaging elements adapted to be mounted on an arbor or spindle of smaller diameter than the internal diameters of the gaging elements and means coacting with the ends of each element for locking the elements against relative rotation on the shaft while permitting lateral shifting of one element relative to an adjacent element an extent determined by the difference between the internal diameters of the elements and the diameter of the spindle.

An additional object of the invention is to provide a plug gage having a handle and one or more spindles or arbors adapted to be adjustably mounted in the end or ends of the handle, two or more gaging elements to be mounted on one or both spindles in various relationships for the convenience of the user and means for permitting coaxial alignment of the external gaging surfaces of the elements when contiguously mounted on either of the spindles while preventing relative rotation of the elements upon the spindle or spindles.

Other objects of the invention and the versatility of the improved gage construction as to its adaptation to various uses will be apparent from a consideration of the following specification and accompanying drawings wherein:

Figure 1 is an elevational view of a plug gage of a construction which is illustrative of the invention, the gage having "go" and "no go" elements located at one end of a handle;

Fig. 2 is an enlarged view of the gage shown in Fig. 1 but with the parts in separated relation;

Fig. 3 is an end elevational view of one of the gaging elements;

Fig. 4 is an end elevational view of a coupling spacer or aligning member;

Fig. 5 is an elevational view of the improved gage comprising a pair of gaging elements, one located at each end of a handle;

Fig. 6 illustrates a plug gage embodying features of the invention and in which the gage elements are located at one end of a handle in a form for convenience in performing gaging operations under special conditions;

Fig. 7 is a broken sectional view of the adjacent ends of two assembled gage elements; and Fig. 8 is a broken sectional view of two gage elements and a spacer having notches and lugs of modified form.

In Fig. 1 of the drawing, a plug gage is shown comprising a handle 10 provided with a central bore 11 therethrough (see Fig. 2) and preferably internally threaded at each end for receiving spindle clamping collets 12, although in the assembly of the parts shown in Fig. 1 but one collet is required. The assembly illustrated in Figs. 1 and 2 comprises in addition to the handle 10, a spindle or arbor 13 in the form of a cylindrical shaft, a pair of gaging elements 14 and 15, the former being a "go" element and the latter a "no go" element, key 16 at one end of the spindle and coupling spacers 17 and 18 which act as torque locking members as will be apparent from the following description.

The gaging elements 14 and 15 are of selected external diameters for use in checking bored holes or passages, the "go" element 14 being of a diameter corresponding to that of the minimum acceptable diameter of the holes being checked, while the "no go" or larger diameter element 15 corresponds to a non-acceptable hole diameter. In use of the gage, if a hole will receive the "go" element but not the "no go" element, it is within the acceptable tolerance range. Hence, the external diameters of the "go" and "no go" elements to be used in a particular gage assembly are determined by the tolerance range permitted in a particular job.

As stated above, the gage is provided with an arbor or spindle 13 and, as is shown in Fig. 1, one end of the same is diametrically slotted to receive the key 16 which is fixed in the slot by welding or brazing, preferably. The protruding ends or lugs of the key 16 have inclined or arcuate surfaces 19, in the form of the gage shown in Figs. 1 to 7, which lugs cooperate in the manner later described with slots arranged in diametrical pairs in each end of the gage elements 14 and 15 and in other elements adapted for use on the spindle. In Fig. 2, the inclined surfaces at the end of the gage element 14 adjacent the key 16 are indicated by numeral 20. These surfaces constitute the bottoms of notches or slots 21 which are formed in the end portions of the gaging elements, and are of a width to receive freely the protruding ends or lugs of the key for keying the element to the spindle against relative angular movement. The inclined surfaces 19 of the key are adapted to contact the inclined surfaces 20 of the slots 21, or the similar surfaces provided at the other end of the element 14 or in the ends of other elements for supporting the forward end of the "go" element of the gage assembly.

The opposite end of the element 14 is provided with a second pair of similar slots providing similar surfaces designated 20a. The surfaces 20a are preferably located in a diametrical plane at right angles to the plane of the slots 20. The gage element 15 is provided at the ends with two similar pairs of notches 22 which provide similar surfaces designated by reference characters 23 and 23a in Fig. 2.

The elements 14 and 15 are formed from stock that is originally solid and are bored from end to end to provide passages somewhat greater in diameter than the diameter of the spindle 13. The cylindrical walls of the passages are indicated by numeral 24. Obtaining true coaxiality between the internal cylindrical surface 24 formed by the boring operations and the external cylindrical surface of an element is a precise machine operation, but in plug gages where the axes of the bores of contiguous elements mounted on closely fitting spindles are eccentric by a few ten thousandths of an inch with respect to the external gaging surfaces, the offsetting of one element with respect to the other due to such eccentricity might render the gage useless, as above indicated. It is for the purpose of enabling the external gaging surface of contiguous gaging elements to be shifted into coaxial alignment that the bore diameters of the elements are made greater than the diameter of the spindle on which the elements are to be assembled. The difference in the diameters mentioned is sufficient to permit lateral adjustment of one element with respect to an adjacent element to effect true coaxial alignment of the external surfaces of the elements notwithstanding that the internal cylindrical surfaces formed by the boring operations may be slightly off center or eccentric with respect to the gaging surfaces of the corresponding elements. Hence, in manufacturing the gage elements which, due to wear during use and sometimes to accidental damage must be replaced from time to time, precise coaxiality of the internal cylindrical surfaces of the elements with respect to the external gaging surfaces thereof is not required. Inaccuracy in boring the gaging elements thus does not require scrapping of an element unless such eccentric offset of the bore diameter with respect to the axis of the external gaging surface is greater than one half the difference between the bore diameter and the diameter of the spindle.

In Fig. 2, the spacing coupler 17 is shown located between the adjacent ends of the elements 14 and 15, the coupler being of ring or annular shape and provided with pairs of lugs 25 and 26 on opposed ends thereof, the lugs of each pair being diametrically opposed and each being spaced 90° from the lugs of the other pair. Each lug is provided with an inclined surface 29 which may correspond to the angles of the surfaces 20, 20a of the slots in the gaging elements when the parts are assembled in a locked up position on the spindle. In Figs. 1 and 2, the coupler 18 is shown as somewhat longer than coupler 17 but is provided at its ends with pairs of lugs 27, 28 similar to lugs 25, 26 of coupler 17 and provided with inclined surfaces 30 similar to the surfaces of the coupler 17. Each coupler has an internal diameter greater than that of the spindle; that is, a diameter not less than the diameter of the internal cylindrical surfaces of the gaging elements for permitting radial shifting of the couplers with respect to the spindle.

The collet 12 is provided for securing the spindle 13 to the handle in telescopically adjusted positions and has an internal bore which may correspond to that of the elements 14 and 15 which, as stated, is greater than the diameter of the spindle or of a diameter just sufficient to receive the spindle. The collet is provided with slots 12a, usually six in number, although but one is shown in Fig. 2, which enable the intermediate finger-like portions 31 to be deflected inwardly into clamping engagement with the spindle 13 when the collet is screwed into the end of the handle a sufficient distance to cause the inclined surfaces 32 at the ends of the fingers to engage the inclined surface 33 at the inner end of the enlarged portion of the passage of the handle.

The collet is shown as provided with a hexagonal nut-like formation 34 for engagement by a wrench for turning the collet into and from the described clamping engagement with the spindle.

The outer end of the collet, as shown in Fig. 2, is provided with a pair of slots or notches 35 similar to the notches 21, 22 of the elements 14 and 15 for receiving locking lugs 28 of the coupler 18 or other like coupler member provided with similar lugs, such as a coupler 17, for example. The notches 35 of the collet are shown as having inclined surfaces 36 corresponding to the inclined surfaces of the lugs of a coupler.

The lugs of the spacers, above-referred to, are slidable in radial directions between the opposite parallel side walls of the respective slots but lock the several parts together against relative rotation when the gage parts have been assembled. Hence if a "go" element, such as element 14 of Fig. 1 is inserted in a hole of a work piece and fits so snugly that it cannot be withdrawn by a straight outward pull, as often occurs, the gage can be rotated about its axis, or turned first in one direction and then the other while an outward pull is exerted thereon to free the element.

Since, as stated above, the bores of the gage elements may not be truly coaxial with respect to the gaging surfaces of the elements, it is desirable to provide means whereby successive elements can be adjusted radially or laterally into positions wherein the exterior surfaces thereof are truly coaxial since otherwise a "no go" element might be excluded from a hole being checked solely by reason of the offset of the element from a true coaxial relation with respect to a "go" element within the hole.

It is for the purpose of enabling the elements, particularly the "no go" element of the assembly shown in Figs. 1 and 2, to be so radially or laterally shifted that the bore diameter of the elements is greater than the diameter of the spindle, as above described. Such radial shifting of an element is not prevented by the lugs of the spacers for the reason that, as illustrated in Fig. 7, the inclined surfaces of the lugs normally do not contact the inclined surfaces of the notches in which they are located. If the elements 14 and 15 and the spacing members 17 and 18 of the assembly shown in Fig. 1 are coaxially arranged, the inclined surfaces of each pair of opposed lugs will be spaced from the inclined surfaces of the respective notches by a distance equal to or greater than the distance through which the element can be shifted in the plane of said lugs by reason of the space between the spindle and the bore surface 24.

The ends of the elements are chamfered as shown, the chamfered surfaces acting as pilots at the foreward or entering end of each element for guiding it into the holes being checked. It will be seen that where a "go" element, such as element 14, is in a hole, the chamfer of the slightly larger "no go" element 15 may engage the margin of the hole and if the element 15 is offset slightly from a true coaxial position, the element will be shifted into coaxial relation with respect to element 14. In other words, the lateral shiftability of the elements provided by the spacings above-described enables an element to adjust itself into a position to enter a hole, if the latter is of sufficient diameter to receive the element, whereby exclusion of a "no go" element from a hole will not occur solely by reason of the gaging surface thereof being slightly offset from coaxial relation with respect to the gaging surface of the "go" element at the beginning of the gaging operation.

The lug receiving notches of the elements 14, 15, above referred to, are shown in Figs. 1 and 2 as having inclined surfaces 20, 20a and 23, 23a, respectively. Fig. 7 illustrates the spacing between the inclined walls of the notches and the inclined walls of lugs at the adjacent ends of the elements 14 and 15 when the latter are in abutting contact with the spacer 17. The provision of notches as shown provides side walls which co- operate with the side walls of the lugs to provide adequate locking engagement without cutting through the gaging surfaces of the elements and forming edges at the surfaces which have a tendency to collect foreign matter and carry it into the holes being checked.

It will be observed that the entering or leading end of the element 15, as viewed in Fig. 7, can be shifted radially in the plane of the notches 22 and will be shifted in a direction at right angles to the foregoing upon the shifting of the spacer 17 relative to the adjacent end of element 14 in the plane of the notches 20a. The trailing or right-hand ends of the elements can be similarly shifted, as will be seen.

The features of the plug gage above-described provide a versatility in use that frequently can be utilized in gaging operations where an assembly such as is shown in Fig. 1 cannot be employed. For example, the bore of the handle preferably extends through the same and is tapped at both ends, whereby, as shown in Fig. 5, by use of a second collet 12' and two shorter spindles, an assembly having gage elements 14 and 15 at the opposed ends of the handle can be provided. The two couplers 17 and 18 or the equivalents thereof may be employed in the assembly shown in Fig. 5 which provides a plug gage which may be employed where the holes to be checked are obstructed at one end or are of insufficient depth to receive the "go" and "no go" elements when the same are arranged in the progressive relation shown in Fig. 1.

In Fig. 6 is shown a gage assembly utilizing a single longer spindle and four gaging elements, the external diameters of which from left to right increase by predetermined increments. Such a gage may be assembled from parts similar to those above-described including a spindle 13' of greater length but otherwise the same as spindle 13, gage elements 38, 39, 40 and 41 identical with those above-described but of selected external diameters and couplers, 17, 17, 17 and 18 like the similarly designated couplers shown in Fig. 2, and a collet 12, all assembled and locked on the spindle and supported by the handle 10. The gage elements of the assembly shown in Fig. 6 are locked against relative rotative movement by the lug and notch arrangement described above although the elements are shiftable laterally as above-described. Such a gage is useful in sorting machine parts into groups according to hole sizes. For example, the first group of assorted parts may consist of those the holes of which will receive the element 38 but not element 39. The second group will consist of parts the holes of which will receive the element 39 but not the element 40, and so forth. The particular gage shown in Fig. 6 merely is illustrative of the novel features of the invention incorporated in a gage adapted for a different purpose but not differing in principle from the gage shown in Figs. 1 and 2.

In Fig. 8, there is shown fragmentarily the adjacent ends of two gage elements designated 14a, 15a and intermediate spacer 17a, the parts being shown in longitudinal section. The notches of the elements, designated 14b, 15b, respectively, instead of the inclined walls described above with respect to the foregoing illustrated structures, are provided with walls 14c, 15c disposed in radial planes of the elements. The lugs 17b of the coupler 17a are illustrated as being generally of block-like form and are adapted to seat freely between the side walls of the respective notches to provide the desired lock for preventing relative rotation of the elements while similar notches at the other ends of the elements cooperate with lugs which prevent rotation of the elements with respect to the spindle and handle, as in the form of the invention described above. The lug and notch arrangement shown in Fig. 8 permits lateral shifting of an element or elements, within the limits provided by the difference in diameter between the bore of the elements and the diameter of the spindle, to enable one element, such as element 15a to move into coaxial alignment with the element 14a in a hole checking operation. Where several such elements are employed on a spindle, as in Fig. 6 for example, the elements, while retained against rotation in the assembly are shiftable laterally relative to the spindle to avoid exclusion from a hole being checked by reason only of a temporary eccentricity of an element with respect to a "go" element within the hole.

In the assembly of two or more gage elements, spacers and a collet upon a spindle and the locking of the spindle to the handle, as in Figs. 1 to 6, for example, the gage members abut against the spacers but are not pressed so tightly together as to prevent the lateral shifting movement described.

While gages embodying the novel features of my invention have been shown and described, it will be apparent that variations thereof may be resorted to within the spirit of the invention defined by the following claims.

I claim:

1. A plug gage comprising a handle, a spindle adapted to be supported by and secured to the handle, an assembly of longitudinally bored gaging elements on the spindle provided with cylindrical outer gaging surfaces, the bores of said elements being of sufficiently greater diameter than the diameter of said spindle to enable said elements to be shifted in radial directions with respect to the spindle into positions wherein the exterior cylindrical surfaces of the elements are in coaxial alignment, and means at the ends of the assembly of elements and disposed between contiguous elements for locking the radially shiftable elements against rotation with respect to the spindle.

2. A plug gage comprising a spindle and a removable handle provided with a longitudinal passage for receiving the spindle, means for securing the spindle and handle together against relative rotation, a plurality of gage elements having cylindrical outer gaging surfaces and longitudinal bores enabling the elements to be disposed upon the spindle, the diameters of the bores of the elements being sufficiently greater than the diameter of the spindle to enable the elements to be shifted radially of the spindle to effect coaxial alignment of the gaging surfaces of the elements independently of the axial redationship of the bores to the gaging surfaces of said elements, and a plurality of cooperating members engaging the ends of the radially shiftable gaging elements for locking the elements against rotation relative to the spindle and handle.

3. A plug gage comprising a spindle and a handle provided with a longitudinal passage for receiving the spindle, means for securing the spindle to the handle against relative rotation, a plurality of gage elements provided with radially disposed notches in the ends thereof and having outer cylindrical gaging surfaces, said elements having longitudinal bores enabling the elements to be disposed upon the spindle, the diameters of the bores of the elements being sufficiently greater than the diameter of the spindle to enable the elements to be shifted radially of the spindle to effect coaxial alignment of the gaging surfaces of the elements independently of the axial relationship of the bores to the gaging surfaces of said elements, and a plurality of members disposed on the spindle at the ends of the elements and provided with radially arranged lugs disposed within the notches of the adjacent ends of the elements for locking the radially adjustable gaging elements against rotation relative to the spindle and handle.

4. A plug gage comprising a spindle and a handle therefor, an assembly of gage elements each provided with cylindrical outer gaging surface and a longitudinal bore through which the spindle extends, the bores of the elements being of greater diameter than the diameter of the spindl by not less than twice the eccentric offset of the axis of the bore from the axis of the gaging surfaces of the respective elements whereby an element can be shifted laterally of the spindle to effect coaxial alignment of the gaging surface thereof with the gaging surface of an adjacent element, said elements being provided with a pair of opposed radial notches in each end thereof, the notches in one end of each element being located at an angle of 90° from the notches in the other end of the element, an annular member located between the adjacent ends of contiguous elements and provided with a bore diameter not less than the bore diameter of the elements and provided with end lugs seated in the respective notches for relative sliding movement in the radial directions of the notches and locking the elements against relative rotation, and means secured to the spindle at the ends of the element assembly and provided with lugs disposed in the notches of the adjacent ends of the respective elements for preventing rotation of the assembly relative to the spindle.

5. A plug gage comprising a spindle, "go" and "no go" cylindrical elements disposed on the spindle, the bore of the elements being of greater diameter than the diameter of the spindle for enabling the elements to be shifted laterally of the spindle into coaxial alignment with respect to the external surfaces thereof, a laterally shiftable spacing member disposed between the adjacent ends of said elements, the ends of the elements being provided with radially disposed notches slidably receiving radially disposed locking lugs, radially disposed locking lugs on said spacing member extending into the notches of the adjacent ends of said elements for preventing relative rotation of said elements and accommodating relative shifting of the ends of the elements in the radial directions of the lugs, and members at the opposed ends of said elements secured to the spindle against rotation thereon and provided with lugs extending into the adjacent notches for preventing rotation of the elements relative to the spindle while accommodating radial shifting movement of the adjacent ends of the elements in the radial directions of the notches.

6. A plug gage comprising a spindle, a pair of cylindrical "go" and "no go" gaging elements provided with longitudinal bores through which the spindle extends, the bores of the elements being of greater diameter than the diameter of the spindle for enabling the elements to be shifted radially of the spindle into positions wherein the exterior surfaces are coaxial, said elements being provided with diametrically disposed slots in the ends thereof, a pair of lugs at the forward end of the spindle disposed in the slots in the adjacent end of the "go" element for preventing rotation of the element with respect to the spindle and adapted for disposition in the slots of the other end of the element upon end-wise reversal thereof upon the spindle, an annular member on the spindle having an internal diameter greater than the diameter of the spindle for accommodating lateral shifting of the member and disposed between adjacent ends of the elements and provided with a pair of diametrically aligned lugs on each face thereof projecting slidably into the slots of the adjacent ends of both elements for locking the same together against relative rotation and adapted to project into the slots at the other end of either element upon end-wise reversal thereof upon the spindle, the lugs on the faces of said annular members being disposed in mutually normal diameters of the member for accommodating lateral shifting movement of the "no go" element in the radial directions of the slots, a longitudinally bored handle for receiving telescopically the rear end portion of the spindle, and means for locking the handle to the spindle in telescopically adjusted relation for retaining said elements against longitudinal displacement from said locked positions.

References Cited in the file of this patent

UNITED STATES PATENTS

| Number | Name | Date |
|---|---|---|
| 950,221 | Bernhardt | Feb. 22, 1910 |
| 1,169,327 | Hess | Jan. 25, 1916 |
| 1,487,834 | Blood | Mar. 25, 1924 |
| 1,514,250 | Briney | Nov. 4, 1924 |
| 1,547,137 | Bagley | July 21, 1925 |
| 1,571,154 | Bagley | Jan. 26, 1926 |
| 1,626,176 | Atwood | Apr. 26, 1927 |
| 2,377,020 | Lundeberg | May 29, 1945 |
| 2,455,347 | Anderer et al. | Dec. 7, 1948 |

FOREIGN PATENTS

| Number | Country | Date |
|---|---|---|
| 474,074 | France | Oct. 31, 1914 |
| 80,247 | Switzerland | Feb. 17, 1919 |